US008655892B2

(12) United States Patent
Masser et al.

(10) Patent No.: US 8,655,892 B2
(45) Date of Patent: Feb. 18, 2014

(54) DATA REORGANIZATION

(75) Inventors: Joel L. Masser, San Jose, CA (US);
Franklin E. McCune, Tucson, AZ (US);
David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 12/893,463

(22) Filed: Sep. 29, 2010

(65) Prior Publication Data
US 2012/0078922 A1 Mar. 29, 2012

(51) Int. Cl.
*G06F 17/30* (2006.01)

(52) U.S. Cl.
USPC ............................................. 707/752

(58) Field of Classification Search
USPC ............................................. 707/752
See application file for complete search history.

(56) References Cited

U.S. PATENT DOCUMENTS 5,408,654 A * 4/1995 Barry ........................... 707/752
6,385,626 B1 * 5/2002 Tamer et al. ........................ 1/1
2003/0135478 A1 * 7/2003 Marshall et al. ................... 707/1
2005/0187990 A1 * 8/2005 Pace et al. ...................... 707/204
2007/0088769 A1 * 4/2007 Pace et al. ...................... 707/204
2008/0077629 A1 * 3/2008 Lorenz et al. .................. 707/203
2009/0049110 A1   2/2009 Plow et al.

OTHER PUBLICATIONS

Dave Lovelace et al., "VSAM Demystified", IBM Redbooks, Sep. 2003.

* cited by examiner

*Primary Examiner* — Neveen Abel Jalil
*Assistant Examiner* — Jagdish Pandya
(74) *Attorney, Agent, or Firm* — Kunzler Law Group

(57) ABSTRACT

An approach to efficient data reorganization. The approach may involve searching for control interval (CI) splits and control area (CA) splits in a data component of a VSAM data set. A mapping is created that maps the source location storing the VSAM data set to a target location. The mapping reorders the VSAM data set such that the CI splits and CA splits are removed when the VSAM data set is moved to the target location in accordance with the mapping. Those CAs that do not include CI splits may be moved without using the host devices' processing resources. For example, the storage device may FlashCopy these areas directly from the source location to the target location. Those CAs that do include CI splits may be moved using the host's processing resources. For example, these CAs may be read into the host, re-ordered by the host, and written by the host to the target location.

13 Claims, 5 Drawing Sheets

DATA REORGANIZATION

FIELD

The subject matter disclosed herein relates to reorganization of data where the physical order of the data does not match the logical order of the data.

BACKGROUND

Description of the Related Art

Certain types of data are optimally stored in a physical order that matches the logical order for the data. For example, a set of data may have records A, B, C, D with keys 1, 2, 3, and 4, respectively. Thus, the logical order of the data (as specified by the keys) is A, B, C, D. These records are ultimately stored at particular physical locations within a storage medium. For example, the data may be stored in tracks of a particular cylinder on a storage medium that involves hard disks. Certain data sets should be physically stored in an order that matches the logical order for optimal performance; in such data sets, having the data set out of order may cause performance delays. Thus, if the records in the example given above are physically stored in order A, D, B, C, the non-sequential ordering may cause additional delays when the data set is being used.

Indexed virtual storage access method (VSAM) data sets are an example of a data set that is optimally stored in sequential order. However, as VSAM data sets grow over time, certain records may be physically stored out of order. In VSAM, the key value specifies the order of the records; when the key value dictates that a particular record be stored at a certain physical location, but there is insufficient room at that physical location for the record, the record may have to be stored out of order. These occurrences are generally referred to as control interval (CI) splits and control area (CA) splits. An excessive number of CI and/or CA splits may cause performance degradation. As a result, VSAM data sets occasionally need to be re-ordered so that records are placed back into physical sequential order which matches the logical sequential order of the records.

Reorganizing a data set such that it is in sequential order may take a considerable amount of time, and consume a significant amount of CPU cycles, bus bandwidth, and time. As data sets continue to increase in size, performing efficient and quick data set reorganizations becomes increasingly important.

BRIEF SUMMARY

The present invention allows for improved data reorganization. The invention may be realized as an apparatus, a computer program product, a method, a system, or in other forms.

An apparatus for improved data reorganization may be configured to search for CI splits and CA splits in a VSAM data set. The VSAM data set is initially stored at a source location in storage. The apparatus may create a mapping between the source location and a target location, which mapping reorders the VSAM data set such that the CI splits and CA splits are removed when the VSAM data set is moved to the target location. Re-ordering the VSAM data set such that the CI and CA splits are removed means that the VSAM data set is re-ordered such that the out of order conditions causing the CI and CA splits are removed.

The apparatus may also move the VSAM data set to the target location in accordance with the mapping. Moving the VSAM data set may involve moving CAs in the VSAM data set that do not include CI splits without host processing, and moving those CAs in the VSAM data set that do include one or more CI splits with host processing.

Searching for CI splits and CA splits in the VSAM data set may involve analyzing an index component of the VSAM data set. The analysis of the index component may involve searching for pointers in the index component that are out of sequential order. The apparatus may search for vertical pointers that are not in sequential order to identify CI splits, and for horizontal pointers that are not in sequential order to identify CA splits. The horizontal pointers may indicate a CA split because the logical order of the index records is different from the physical order.

Creating the mapping between the source location and the target location may involve allocating a new VSAM data set and reorganizing the index component of the VSAM data set. Creating the mapping may also involve creating from to blocks that reference the source location where the VSAM data set is stored and the target location where the re-ordered VSAM data set is to be stored.

Moving the CAs of the VSAM data set that do not have CI splits without processing by the host may involve using a Flashcopy procedure of the storage device that stores the VSAM data set. Such a procedure may copy these CAs without involving the host. Moving CAs that include CI splits with processing by the host may involve the host reading, re-ordering, and writing the CAs of the VSAM data set to the target location.

In certain embodiments, the apparatus may deal more generally with reordering data sets. Such embodiments may involve the apparatus searching for sections of the data set that are not in sequential order and creating a mapping between the source location (where the data set is stored) and a target location (where the data set will be stored after reordering). The mapping reorders the data set such that the data set is in sequential order when the data set is moved to the target location in accordance with the mapping. The apparatus may move those sections of the data set that are in sequential order without processing by the host, and move those sections of the data set that are not in sequential order with processing by the host.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
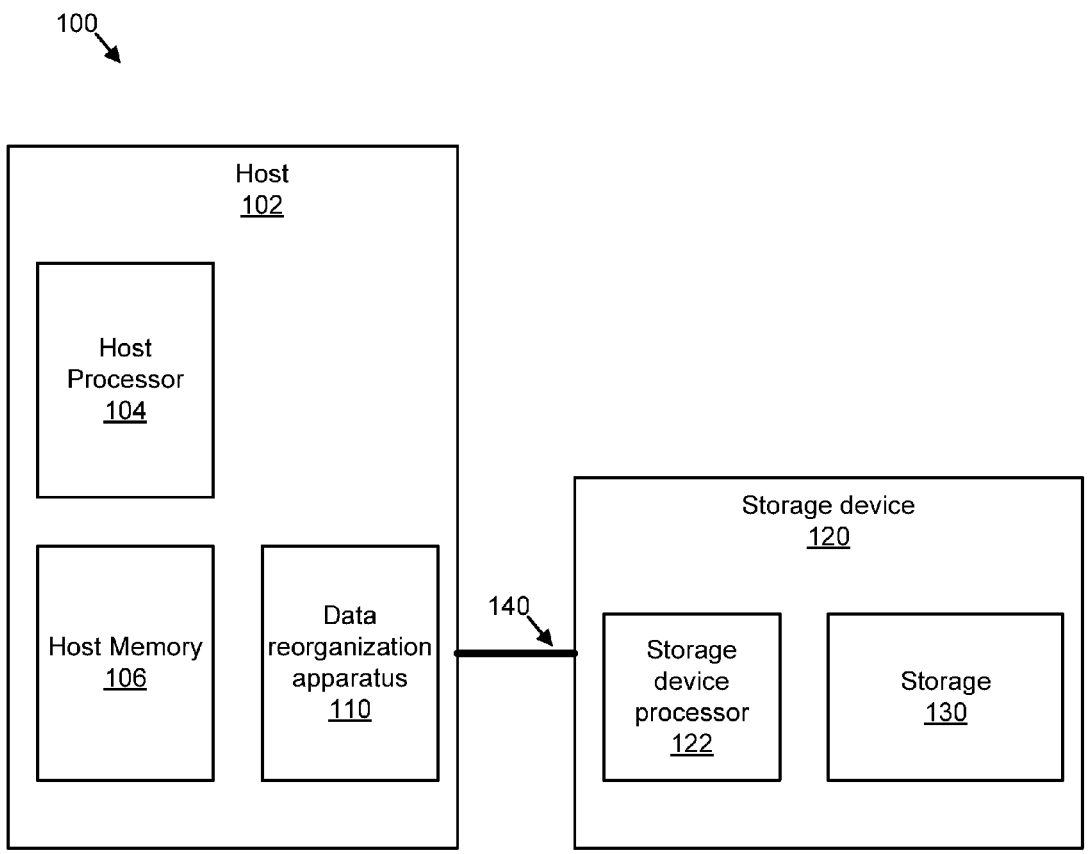
FIG. 1 is a schematic block diagram illustrating one embodiment of a system including a host and a storage device for improved data reorganization.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in microcode, firmware, or the like of programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-Ray Disc (BD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fibre cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fibre optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 depicts one embodiment of a system 100 for improved data reorganization. In one embodiment, the system 100 includes a host 102 and a storage device 120. The host 102 includes a host processor 104 and host memory 106. The host processor 104 may be used to execute instructions and operations for the host 102. The host memory 106 may provide storage in support of the host processor 104. The host 102 may comprise many other components which are not shown in FIG. 1 for simplicity. The host 102 may be a desktop computer, a laptop computer, a mainframe computer, or other suitable computing device.

The host 102 is connected to a storage device 120 by a communications connection 140. The host 102 can store data to the storage device 120 and retrieve data from the storage device 120 using the communications connection 140. The communications connection 140 may be a bus for transferring data between the host 102 and the storage device 120. The communications connection 140 may be an internal bus or an external bus, or a network connection. Examples of suitable communications connections 140 include, but are not limited to, PCI-e, Infiniband, HyperTransport, Fibre Channel, Ethernet, and others.

The storage device 120 stores data (including data, metadata, and other varieties of data) for use by attached devices, such as the host 102. The storage device 120 may be a direct attached storage device (DASD), an Enterprise Storage Subsystem, or other storage system. The storage device 120 includes a storage device processor 122 and storage 130. The storage device processor 122 may be part of a storage controller (also commonly referred to as a disk controller) which facilitates storing and retrieving data from the storage 130. The storage 130 may be any suitable non-volatile medium for storing data. The storage 130 may be tape, hard drives, solid-state storage, optical, or other variety of non-volatile media.

As noted above, certain types of data sets are optimally stored in a physical order that matches the logical order for the data set. The data reorganization apparatus 110 directs re-ordering of the data set using both the host processor 104 and the storage device processor 122 in order to provide more efficient data set reordering. In certain embodiments, the data reorganization apparatus 110 identifies sections of a data set that are not stored in sequential order. The data set is stored at a source location. The data reorganization apparatus 110 may then create a mapping for the data set between the source location in storage 130 and a target location in storage 130. The mapping reorders the data set such that, when it is moved to the target location, the data set will be in sequential order.

The data reorganization apparatus 110 may move those sections of the data set that are in sequential order without processing by the host 102. As used in this application, moving sections of the data set without host processing means that these sections of the data set are not sent to the host 102 over the communications connection 140. However, certain information (such as control information) may be shared between the host 102 and the storage device 120 to facilitate data movement, as described in greater detail below. In certain embodiments, the storage device processor 122 may be responsible for moving sections that are in order to the target location.

The data reorganization apparatus 110 may move those sections of the data set that are not in sequential order with processing by the host 102. This may involve the storage device 120 sending these sections to the host 102 over the communications connection 140, the host processor 104 re-ordering these sections such that they are in sequential order, and then sending the re-ordered sections to the storage device 120 to be written to the target location in the storage 130. Operations of the data reorganization apparatus 110 are described in greater detail below.

Figure 2:
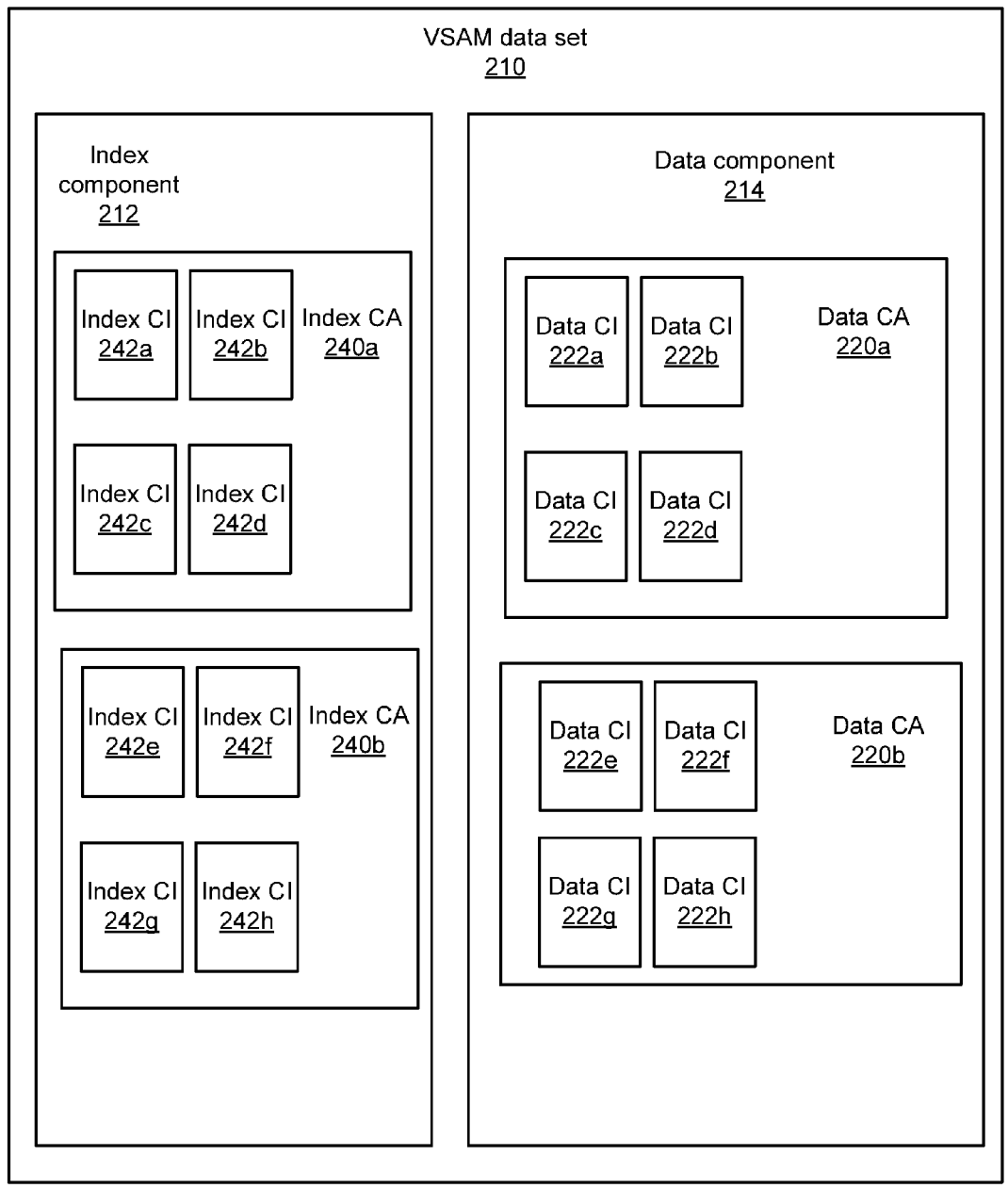
FIG. 2 is a schematic block diagram illustrating one embodiment of a VSAM data set which may benefit from improved data reorganization.

FIG. 2 shows a VSAM data set 210, which is one embodiment of a data set that may benefit from being re-ordered and stored in sequential order. Other types of data sets may also benefit from being re-ordered and stored in sequential order, and the present invention is not limited to a particular type of data set, although a VSAM data set is used as an example in this application. Data set, as this term is used in this application, refers to any collection of data that benefits from being stored in a physical sequential order that matches the logical sequential order of the data. VSAM is a disk file storage access method commonly used with the IBM z/OS operating system. VSAM supports four different data set organizations: Key Sequenced Data Set (KSDS), Relative Record Data Set (RRDS), Entry Sequenced Data Set (ESDS) and Linear Data Set (LDS).

Certain types of VSAM data sets 210 have components, which are individual parts of the VSAM data set 210. The two types of VSAM components are index component 212 and data component 214. For example, KSDS and VRRDS VSAM data sets 210 have index components 212 and data components 214, while ESDS, RRDS, and LDS VSAM data sets 210 only have data components 214. The components may be multi-extent and/or multi-volume.

VSAM records are generally organized in fixed-size blocks called control intervals (CI). A CI is a contiguous area of direct access storage that VSAM uses to store data records and control information that describes the records. A CI generally includes logical records, free space for new logical records to be inserted into, and control information. A CI is the unit of information that VSAM transfers between a storage device 120 and a host 102.

CIs are organized into control areas (CAs). A CA includes two or more CIs put together into fixed-length contiguous areas of storage 130. The example in FIG. 2 shows the data component 214 comprising data CIs 222a-d organized in data CA 220a, and data CIs 222e-h organized in data CA 220b. Index component 212 includes Index CAs 240a-b with Index CIs 242a-d and 242e-h respectively. A VSAM data set 210 is composed of one or more CAs. In certain embodiments, a CA is the size of a 3390/3380 cylinder. The minimum size of a CA is one track.

In a VSAM data set 210, the index key (stored in the index component 212) of a record determines the record's position in the data component 214 of the VSAM data set 210. Thus, when a record is inserted into a CI, the record is placed in the correct sequential order relative to other records. The index component 212 allows the VSAM to randomly retrieve a record from the data component 214 when a request is made for a record with a particular index key.

Since the index key determines the record's position in the VSAM data set 210, if a record is to be inserted in key sequence in the data component 214, but there is not enough free space in the particular data CI 222a-h, the data CI 222a-h is split. For example, if there is not enough free space in data CI 222a for a record that should be stored there, this causes a CI split. Approximately half of the records in the affected CI (in this example, data CI 222a) are transferred to a free data CI 222a-d that is provided by the data CA 220a, and the record is inserted in the original data CI 222a. If there are no free data CIs 222a-d in the data CA 222a, then a CA split occurs. Half of the data CIs 222a-d are sent to the first available data CA 222b at the end of the data component 214. This movement creates free data CIs 222a-d in the original data CA 220a. These CI splits and CA splits can introduce performance problems in time. Additional information on VSAM data sets, CI splits, and CA splits can be found in the IBM redbook by Dave Lovelance, Rama Ayyar, Alvaro Sala, and Valeria Sokal, *VSAM Demystified*, (September 2003, 2d Ed), which is incorporated by reference in its entirety.

Figure 3:
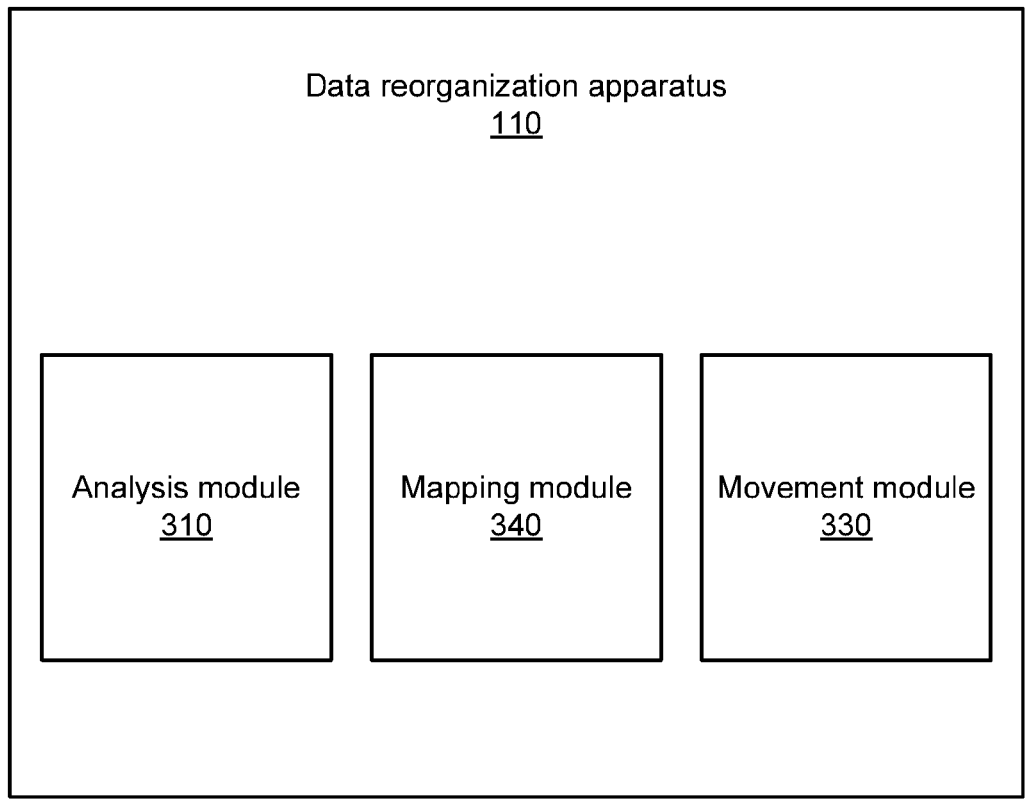
FIG. 3 is a schematic block diagram illustrating one embodiment of a data reorganization apparatus.

FIG. 3 shows one embodiment of a data reorganization apparatus 110 for improved data reorganization. The data reorganization apparatus 110 may include an analysis module 310, a mapping module 340, and a movement module 330. The data reorganization apparatus 110 may be implemented in hardware, firmware, software, or some combination thereof. The data reorganization apparatus 110 may be implemented on the host 102, the storage device 120, or have components distributed between the host 102 and the storage device 120.

The analysis module 310 may be configured to search for sections of a data set that are not in sequential order. The data set may be stored in the storage 130 at a source location. The mapping module 340 may create a mapping between the source location on the storage 130 and a target location for the data set on the storage 130. The mapping may re-order the data set such that the data set, once it is moved to the target location in accordance with the mapping, is in sequential order. The movement module 330 may actually implement the movement of the data set to the target location in accordance with the mapping created by the mapping module 340. The movement module 330 may move those sections of the data set that are already in sequential order without processing by the host 102, and move those sections of the data set that are not in sequential order with processing by the host.

The section below describes in detail how a data reorganization apparatus 110 may operate on a VSAM data set 210. As noted above, a VSAM data set 210 is simply one example of a data set which may benefit from the re-ordering scheme described below. The present invention is not limited to VSAM data sets 210, and may have broader applicability.

In one embodiment, the analysis module 310 searches for one or more CI splits and CA splits in the VSAM data set 210. As noted above, the VSAM data set 210 may be stored at a source location at the time of analysis. Searching for CI splits and CA splits may involve analyzing the index component 212 of the VSAM data set 210. In certain embodiments, the analysis module 310 analyzes the index component 212 by searching for one or more pointers in the index component 212 that are out of sequential order.

An index component 212 in a VSAM data set 210 may have more than level (for example, using a balanced tree), with each level containing vertical pointers to the next lower level. As noted above, the index component 212 is also made up of CIs (such as index CIs 242a-h) and CAs (such as index CAs 240a-b). In certain embodiments, there is one index CI 242a-h for each data CA 220a-b.

Each index entry in the index CIs 242a-h may point to a data CI 222a-h and show the highest key within that data CI

222*a-h*. The index component 212 may implement a sequence set and an index set. The sequence set is the lowest level of index CIs 242*a-h*, which directly point to the data CIs 222*a-h*. The index set is the remainder of the index component 212. The sequence set index CIs 242*a-h* include horizontal pointers from one sequence set index CI 242*a-h* to the next higher keyed sequence set index CI 242*a-h*. When a split occurs in the data component 214, a new index entry is created and a new data CI 222*a-h* is created. The index entries will still be in keyed order, but the pointers will no longer be in order.

In certain embodiments, the analysis module 310 searches the index component 212 for one or more vertical pointers that are not in sequential order. Vertical pointers that are not in sequential order indicate the presence of a CI split in the data component 214. The analysis module 310 may also search the index component 212 for one or more horizontal pointers that are not in sequential order. Horizontal pointers that are not in sequential order indicate the presence of a CA split in the data component 214. The analysis module 310 may find the locations of CI splits and CA splits and thereby identify one or more sections of data component 214 of the VSAM data set 210 that are not in sequential order.

The mapping module 340 may create a mapping between the source location on the storage 130 and a target location on the storage 130. The mapping may reorder the VSAM data set 210 such that the CI splits and CA splits are removed once the VSAM data set 210 is moved to the target location in accordance with the mapping. This means that the out of order conditions in the VSAM data set 210 which caused the CI splits and CA splits are removed; the VSAM data set 210 is placed back in sequential order.

Figure 4:
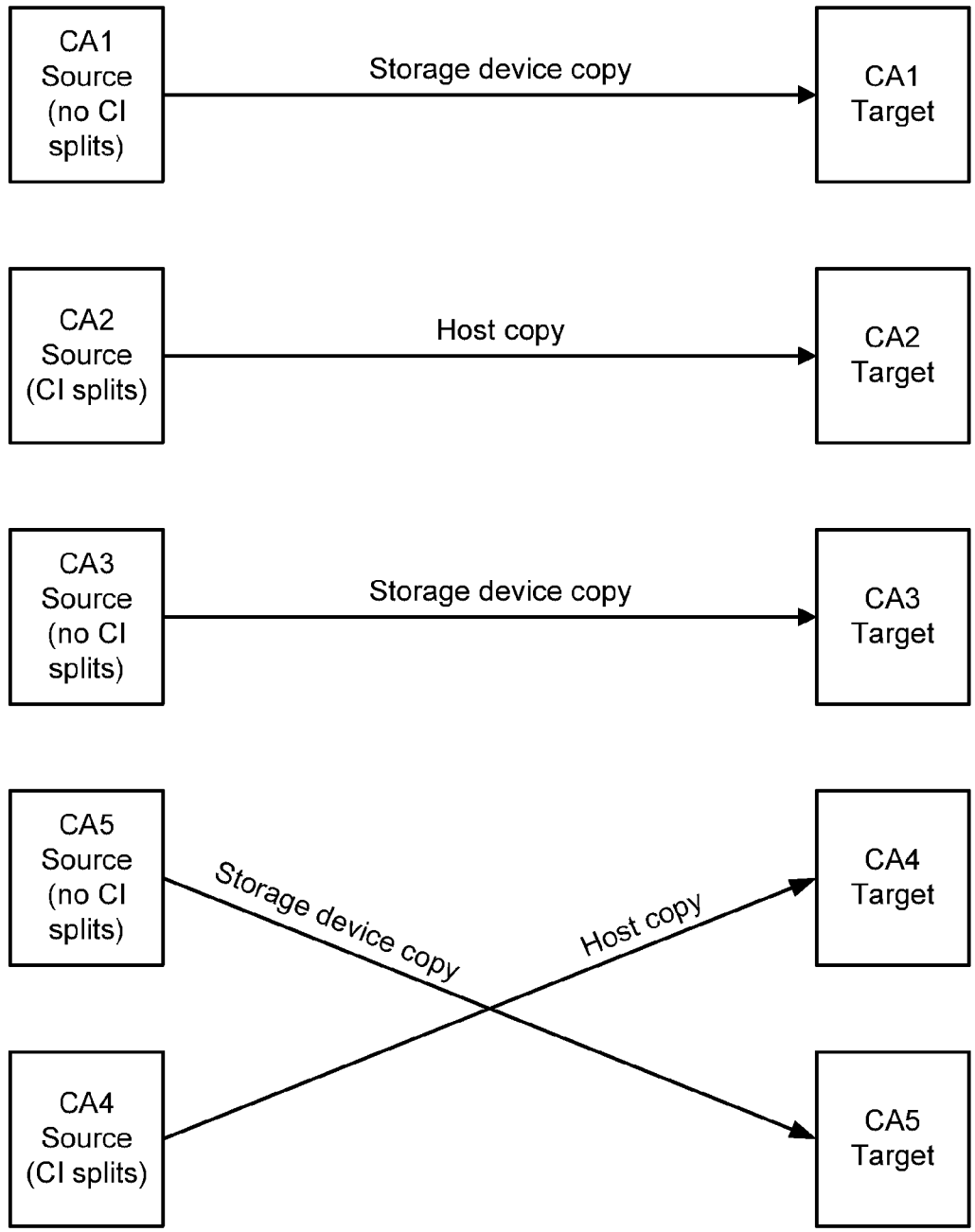
FIG. 4 is an example of data mapping and movement of a VSAM data set.

An example of a mapping is presented in connection with FIG. 4. The mapping module 340 may allocate a new VSAM data set and reorganize the index component 212 for the VSAM data set 210 as part of mapping process. In certain embodiments, the mapping module 340 reorganizes the index component 212 by reordering the index component 212 based on how the index component 212 would look if the data component 214 of the VSAM data set 210 were in sequential order.

The mapping can also affect data CAs 220*a-b* that were not previously split. For example, a data CA 220*a-b* may be in sequential order, but a previous split may have moved the data CA 220*a-b* with earlier key values to the end of the data component 214. This out of order data CA 220*a-b* needs to be moved back into sequential order, and a CA 220*a-b* with higher keyed data may need to be shifted to make room for a CA 220*a-b* with lower keyed data.

The mapping module 340 may create "from to blocks" that reference the source location and the target locations. In certain embodiments, the from to blocks specify a range of addresses to be moved from the source location to the target location. If multiple adjacent data CAs 220*a-b* are already in sequential order, the mapping module 340 may specify a range encompassing all of those adjacent data CAs 220*a-b* in the from to block, where the entire range is to be moved to a range in the target location.

In certain embodiments, when all records are deleted out of a data CA 220*a-b*, the data CA 220*a-b* may be left allocated within the data component 214. In certain embodiments, the last record in the otherwise empty CA 220*a-b* cannot be deleted. In such embodiments, only records with key values that are less than the last record's value, and higher than the key value of the data CA 220*a-b* before the empty data CA 220*a-b* can use the empty data CA 220*a-b*. This may result in inefficient use of space in the data component 214. In other embodiments, the last record in the otherwise empty data CA 220*a-b* can be deleted and the empty data CA 220*a-b* can be reclaimed.

In certain embodiments, the mapping module 340 excludes empty data CAs 220*a-b* in the source location of the VSAM data set 210 from the mapping between the source location and the target location. The mapping module 340 may do so by not building a from to block for empty data CAs 220*a-b*. The mapping module 340 may be configured to recognize empty data CAs 220*a-b* that have not been reclaimed (for example, empty data CAs 220*a-b* that retain the last record in implementations where the last record cannot be deleted) or that have been reclaimed and recognize that these empty data CAs 220*a-b* do not need to be preserved. By excluding these empty data CAs 220*a-b* from the mapping process (by not building a from to block for such empty data CAs 220*a-b*), the mapping module 340 can efficiently reclaim this space.

The movement module 330 is configured to move the VSAM data set 210 to the target location in accordance with the mapping generated by the mapping module 340. In one embodiment, the mapping module 340 moves data CAs 220*a-b* of the data component 214 of the VSAM data set 210 that do not include any CI splits without processing by the host 102. As noted above, moving sections (such as data CAs 220*a-b*) of a data set without processing by the host 102 means that the data set is moved from the source location to the target location without the sections being transmitted across the communications connection 140. The host 102 may still have some involvement in moving the data CAs 220*a-b* without CI splits; for example, the mapping module 340 may use the host processor 104 to create the from to blocks that specify which data CAs 220*a-b* to move without processing by the host 102. Other preparations for moving the data CAs 220*a-b* that do not have CI splits may also occur using resources of the host 102.

In one embodiment, the movement module 330 moves those data CAs 220*a-b* that do not have CI splits without host 102 processing by using the resources of the storage device 120. In one embodiment, the storage device 120 can move data from one location on the storage 130 to another location on the storage 130 using the storage device processor 122. The host 102 may pass the storage device processor 122 the from to blocks created by the mapping module 340, and the storage device processor 122 may execute those from to blocks. For example, the storage device 120 may support a FlashCopy process that uses the resources provided by the storage device 120 and/or an Enterprise Storage Subsystem to move data from one location to another without processing by the host 102.

In one embodiment, the movement module 330 moves those data CAs 220*a-b* of the VSAM data set 210 that include CI splits with processing by the host 102. The host 102 may process the data CAs 220*a-b* that have CI splits using standard I/O approaches. For example, the movement module 330 may have the host 102: read out the data CAs 220*a-b* that have CI splits over the communications connection 140; re-order the data CIs 220*a-h* in the data CAs 220*a-b* such that the records in the data CIs 220*a-h* are in sequential order; and write the re-ordered data CAs 220*a-b* of the VSAM data set 210 to the target location on the storage 130.

At the end of the process, the VSAM data set 210 will be stored at the target location and be in physical sequential order to match the logical sequential order specified for the data component 214 by the index component 212. This reordering may improve performance of the system and be accomplished in less time, and with fewer requirements on the host 102, than with traditional reorganization approaches.

The reordering may be accomplished with fewer host processor 104 cycles, less traffic on the communications connection 140, and generally using fewer resources of the host 102.

FIG. 4 shows one example of reordering a VSAM data set 210. In the depicted embodiment, the data component 214 of the VSAM data set 210 may originally comprise five data CAs stored at a source location, designated CA1-5 source. As seen in FIG. 4, certain data CAs contain CI splits (CA2, and CA4), while others do not (CA1, CA3, CA5). In addition, the data component 214 may contain CA splits causing the data CAs to be out of order. In a first step, the analysis module 310 may analyze the index component 212 to determine which data CAs have CI splits, and where data CA splits have occurred in the data component 214.

The mapping module 340 creates a mapping between the source location and a target location for the VSAM data set 210. The mapping reorders the VSAM data set 210 such that the CI splits and CA splits are removed at the target location, as seen in FIG. 4. As discussed above, this mapping may use from to blocks. The movement module 330 then moves the data component 214 of the VSAM data set 210 such that the re-ordering takes place in accordance with the mapping. The movement module 330 may move certain portions of the VSAM data set 210 without host 102 processing; for example, CA1, CA3, and CA5, which do not have CI splits, are moved without host 102 processing. In certain embodiments, CA1, CA3, and CA5 may be moved by the storage device 120. The movement module 330 may move those portions of the VSAM data set 210 that contain CI splits with processing by the host 102. For example, CA2 and CA4 may be read into the host 102, re-ordered, and written out to the target location on the storage device 120 in sequential order using standard I/O.

At the end of the process, the CIs in the VSAM data set 210 are once again in sequential order based on key values. As a result, the physical order of the VSAM data set 210 corresponds to the logical order of the VSAM data set 210. In addition, as described above, empty CAs may be excluded from the mapping such that unused space is removed during the reorganization process.

Figure 5:
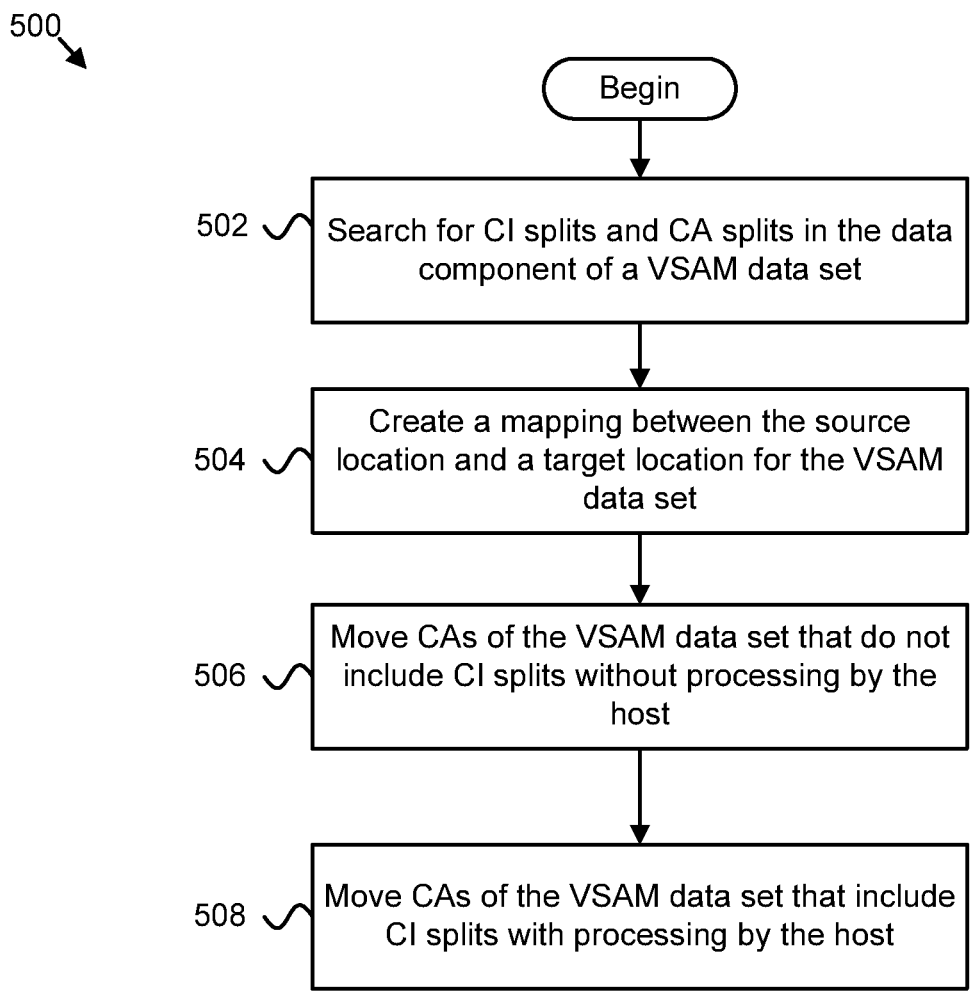
FIG. 5 is a flow chart diagram illustrating one embodiment of a method for improved data reorganization.

FIG. 5 shows one embodiment of a method for reorganizing a data set. The method begins with searching 502 for CI splits and CA splits in the data component 214 of the VSAM data set 210. The search may be conducted against the index component 212. In certain embodiments, searching for CI splits and CA splits involves analyzing the index component 212 for pointers that are out of sequential order. The search may involve searching for vertical pointers that are not in sequential order to identify CI splits, and searching for horizontal pointers that are not in sequential order to identify CA splits.

The method may also include creating 504 a mapping between the source location and the target location for the data component 214 of the VSAM data set 210. The mapping may cause the CI splits and CA splits in the data component 214 of the VSAM data set 210 to be removed when the data component 214 is moved to the target location, as described above. In certain embodiments, creating the mapping involves creating a plurality of from to blocks that reference the source location and the target location. Creating the mapping may also involve excluding empty CAs in the data component 214 of the VSAM data set 210 from the mapping between the source location and the target location.

The method may include moving 506 CAs of the data component 214 that do not include CI splits without processing by the host 102. In certain embodiments, the CAs are moved 508 using a FlashCopy procedure, or comparable procedure, implemented for the storage device 120.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a non-transitory computer readable storage medium storing computer readable program code executable by processors on a host and a storage device for improved data reorganization on the storage device, the computer program product configured to:

search for one or more control interval (CI) vertical pointers that are not in sequential order and one or more control area (CA) horizontal pointers that are not in sequential order in a virtual storage access method (VSAM) data set, wherein each CA comprises a CA index of CI indexes and a data component with CI data and the VSAM data set is stored at a source location of the storage device;

create a mapping between the source location and a target location of the storage device for the VSAM data set, wherein the mapping reorders the VSAM data set such that each CI vertical pointer and each CA horizontal pointer of the VSAM data set is in sequential order in response to the VSAM data set being moved to the target location in accordance with the mapping; and move the VSAM data set to the target location in accordance with the mapping by moving, using a host copy by the host, first CI vertical pointers, first CI horizontal pointers, and first CI data that are not in sequential order from the source location to the host, the host reordering the first CI vertical pointers, the first CI horizontal pointers, and the first CI data according to the mapping and moving the reordered the first CI vertical pointers, first CI horizontal pointers, and first CI data to the target location, and moving, using a storage device copy by the storage device, second CI vertical pointers, second CI horizontal pointers, and second CI data that are in sequential order directly from the source location to the target location according to the mapping.

2. The computer program product of claim 1, wherein creating the mapping between the source location and the target location further comprises excluding empty CAs in the source location of the data component from the mapping between the source location and the target location.

3. The computer program product of claim 1, wherein creating the mapping between the source location and the target location further comprises:

allocating a new VSAM data set at the target location; and creating a plurality of from to blocks that map the VSAM data set at the source location to the new VSAM data set at the target location.

4. An apparatus for improved data reorganization on a storage device, the apparatus comprising:

a non-transitory computer readable storage medium storing computer readable program code executable by processors on a host and the storage device, the computer readable program code comprising:

an analysis module searching for one or more control interval (CI) vertical pointers that are not in sequential order and control area (CA) horizontal pointers that are not in sequential order in a virtual storage access method (VSAM) data set, wherein each CA comprises a CA index of CI indexes and a data component with CI data and the VSAM data set is stored at a source location of the storage device;

a mapping module creating a mapping between the source location and a target location of the storage device for the VSAM data set, wherein the mapping reorders the VSAM data set such that each CI vertical pointer and each CA horizontal pointer of the VSAM data set is in sequential order in response to the VSAM data set being moved to the target location in accordance with the mapping; and a movement module moving the VSAM data set to the target location in accordance with the mapping by moving, using a host copy by the host, first CI vertical pointers, first CI horizontal pointers, and first CI data that are not in sequential order from the source location to the host, the host reordering the first CI vertical pointers, the first CI horizontal pointers, and the first CI data according to the mapping and moving the reordered the first CI vertical pointers, first CI horizontal pointers, and first CI data to the target location, and moving, using a storage device copy by the storage device, second CI vertical pointers, second CI horizontal pointers, and second CI data that are in sequential order directly from the source location to the target location according to the mapping.

5. The apparatus of claim 4, wherein creating the mapping between the source location and the target location further comprises:

allocating a new VSAM data set at the target location.

6. The apparatus of claim 5, wherein creating the mapping between the source location and the target location further comprises creating a plurality of from to blocks that map the VSAM data set at the source location to the new VSAM data set at the target location.

7. The apparatus of claim 6, creating the mapping between the source location and the target location further comprising excluding empty CAs in the source location of the VSAM data set from the mapping between the source location and the target location.

8. The apparatus of claim 4, wherein moving CAs of the VSAM data set that do not include CI vertical pointers that are not in sequential order and CA horizontal pointers that are not in sequential order comprises using a Flashcopy procedure of a storage device storing the VSAM data set.

9. A method for improved data reorganization on a storage device, the method comprising:

searching, by use of processors on a host and the storage device, for one or more control interval (CI) vertical pointers that are not in sequential order and one or more control area (CA) horizontal pointers that are not in sequential order in a virtual storage access method (VSAM) data set, wherein each CA comprises a CA index of CI indexes and a data component with CI data and the VSAM data set is stored at a source location of the storage device;

creating a mapping between the source location and a target location of the storage device for the VSAM data set, wherein the mapping reorders the VSAM data set such that each CI vertical pointer and each CA horizontal pointer of the VSAM data set is in sequential order in response to the VSAM data set being moved to the target location in accordance with the mapping; and moving the VSAM data set to the target location in accordance with the mapping by moving, using a host copy by the host, first CI vertical pointers, first CI horizontal pointers, and first CI data that are not in sequential order from the source location to the host, the host reordering the first CI vertical pointers, the first CI horizontal pointers, and the first CI data according to the mapping and moving the reordered the first CI vertical pointers, first CI horizontal pointers, and first CI data to the target location, and moving, using a storage device copy by the storage device, second CI vertical pointers, second CI horizontal pointers, and second CI data that are in sequential order directly from the source location to the target location according to the mapping.

10. The method of claim 9, wherein creating the mapping between the source location and the target location further comprises allocating a new VSAM data set at the target location and creating a plurality of from to blocks that map the VSAM data set at the source location to the new VSAM data set at the target location.

11. The method of claim 10, wherein creating the mapping between the source location and the target location further comprising excluding empty CAs in the VSAM data set from the mapping between the source location and the target location.

12. The method of claim 9, wherein moving CAs of the VSAM data set that do not include CI vertical pointers that are not in sequential order and CA horizontal pointers that are not in sequential order comprises using a Flashcopy procedure of a storage device storing the VSAM data set.

13. A system for improved data reorganization on a direct attached storage device (DASD), the system comprising:

the DASD storing a virtual storage access method (VSAM) data set at a source location, wherein the DASD supports a FlashCopy operation for moving data from the source location to a target location of the DASD without processing by a host connected to the DASD;

the host connected to the DASD, the host comprising a data reorganization apparatus configured to:

search for one or more control interval (CI) vertical pointers that are not in sequential order and one or more control area (CA) horizontal pointers that are not in sequential order the VSAM data set;

create a mapping between the source location and the target location for the VSAM data set, wherein the mapping reorders the VSAM data set such that each CI vertical pointer and each CA horizontal pointer of the VSAM data set is in sequential order in response to the VSAM data set being moved to the target location in accordance with the mapping;

move the VSAM data set to the target location in accordance with the mapping by moving, using a host copy by the host, first CI vertical pointers, first CI horizontal pointers, and first CI data that are not in sequential order from the source location to the host, the host reordering the first CI vertical pointers, the first CI horizontal pointers, and the first CI data according to the mapping and moving the reordered the first CI vertical pointers, first CI horizontal pointers, and first CI data to the target location, and moving, using a DASD copy by the DASD, second CI vertical pointers, second CI horizontal pointers, and second CI data that are in sequential order directly from the source location to the target location according to the mapping.

* * * * *